(12) United States Patent
Ogino

(10) Patent No.: US 7,299,058 B2
(45) Date of Patent: Nov. 20, 2007

(54) POSITION CALCULATION METHOD AND STORAGE MEDIUM STORING A PROGRAM THEREFOR

(75) Inventor: Atsushi Ogino, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 11/201,249

(22) Filed: Aug. 11, 2005

(65) Prior Publication Data

US 2006/0068810 A1 Mar. 30, 2006

(30) Foreign Application Priority Data

Sep. 27, 2004 (JP) ............................. 2004-278656

(51) Int. Cl.
*H04Q 7/20* (2006.01)
(52) U.S. Cl. .............................. 455/456.1; 455/456.6; 342/357.1
(58) Field of Classification Search ............ 455/456.1, 455/456.6; 342/357.1
See application file for complete search history.

(56) References Cited

U.S. PATENT DOCUMENTS 6,252,543 B1 * 6/2001 Camp .................... 342/357.06
6,587,692 B1 * 7/2003 Chen et al. .............. 455/456.1
7,064,706 B2 * 6/2006 King et al. ............ 342/357.02

FOREIGN PATENT DOCUMENTS

JP 2004-101254 4/2004

OTHER PUBLICATIONS 4.1.1 Single unit measurement principle, "Foundation of GPS Measurement", Japan Measurement Association, 1995 by Atushi Tuchiya and Hiromichi Tuji.

* cited by examiner

*Primary Examiner*—Nick Corsaro
*Assistant Examiner*—Simon A Goetze
(74) *Attorney, Agent, or Firm*—Antonelli, Terry, Stout & Kraus, LLP.

(57) ABSTRACT

A position calculation method includes a step of calculating error degradation quantities about respective measurement results ("distance-ranging results") on distances between respective reference stations and a detection-target station from the respective distance-ranging results and positions of the respective reference stations, a step of calculating weight-assigning factors about the respective distance-ranging results based on the respective error degradation quantities, a step of checking the number of valid distance-ranging results, and a step of calculating the position of the detection-target station based on the respective distance-ranging results, the positions of the respective reference stations, and the respective weight-assigning factors.

10 Claims, 7 Drawing Sheets

POSITION CALCULATION METHOD AND STORAGE MEDIUM STORING A PROGRAM THEREFOR

INCORPORATION BY REFERENCE

The present application claims priority from Japanese application JP2004-278656 filed on Sep. 27, 2004, the content of which is hereby incorporated by reference into this application.

BACKGROUND OF THE INVENTION

1. Field of the Invention

The present invention relates to a position calculation method. More particularly, it relates to a method for calculating position of a radio device on the basis of distance-ranging results using electromagnetic waves.

2. Description of the Related Art

For example, according to Atushi Tuchiya and Hiromichi Tuji, "Foundation of GPS Measurement", Japan Measurement Association, 1995, a GPS receiver receives signals from a plurality of GPS satellites. Moreover, these respective reception signals allow position of the GPS receiver to be detected.

Also, according to JP-A-2004-101254, a plurality of radio base stations receive signals from a radio terminal. Moreover, these respective reception signals allow position of the radio terminal to be detected.

In both of the above-described technologies, as illustrated in FIG. 1, based on measurements of reception timings of radio signals between each of a plurality of radio devices (hereinafter, referred to as "reference stations") 101, 102, . . . , 10n whose positions $P_i$ (i=1, 2, . . . , n) have been already known and a radio device (hereinafter, referred to as "a detection-target station") 100 whose position P has been unknown, distances between each of the reference stations and the detection-target station are measured, letting the distances be $R_i$ (i=1, 2, . . . , n) respectively. Furthermore, the position P is calculated based on the above-described $R_i$ (i=1, 2, . . . , n) and $P_i$ (i=1, 2, . . . , n).

Between the above-described two technologies, there exists a difference that the sides for measuring the reception timings differ from each other. In principle, however, the position P is acquired as the solution of the following simultaneous equations, which are designated as Expression 1.

$$\{R_i + cT - \|P_i - P\|\} = 0, \; i=1, \ldots, n \quad \text{Expression 1}$$

In Expression 1, $\|x\|$ denotes magnitude of a vector x, c denotes speed of the radio waves, and T denotes offset of a clock selected as the reference when the distances $R_i$ (i=1, 2, . . . , n) are measured.

In Expression 1, the unknowns are P and T. In addition, the above-described solution can be acquired in the case where n≧3 if P is a point on a two-dimensional space, and in the case where of n≧4 if P is a point on a three-dimensional space. By the way, when operating the radio position detection systems like this in environments such as indoors where reflections of the radio signals can happen easily, waveform distortions in the radio signals are likely to occur because of multiple signal reflections. On account of this, the measurements of the respective reception timings of the radio signals, i.e., the measurements of the distances between each of the reference stations and the detection-target station, turn out to contain large quantities of offsets. As a result, offset in the position calculation result P increases in quantity.

SUMMARY OF THE INVENTION

Accordingly, it is an object of the present invention to reduce the offset in the calculation position of the detection-target station in the multipath environment by predicting the offsets contained in the measurements of the distances between each of the reference stations and the detection-target station.

In order to accomplish the above-described object, a position calculation method according to the present invention includes the following steps: Calculating error degradation quantities about the respective measurement results on the distances between the respective reference stations and the detection-target station (hereinafter, referred to as "distance-ranging results") from the respective distance-ranging results and the positions of the respective reference stations, evaluating the respective distance-ranging results based on the respective error degradation quantities, and determining weight-assigning factors about the respective distance-ranging results, checking the number of valid distance-ranging results, and calculating the position of the detection-target station based on the respective distance-ranging results, the positions of the respective reference stations, and the respective weight-assigning factors.

According to the present invention, the offsets are predicted which are contained in the measurements of the distances between the respective reference stations and the detection-target station, thereby controlling influences which the offsets exert on the position calculation. This makes it possible to reduce the offset contained in the position calculation result.

Other objects, features and advantages of the invention will become apparent from the following description of the embodiments of the invention taken in conjunction with the accompanying drawings.

DETAILED DESCRIPTION OF THE INVENTION

First, assume that Expression 1 is overdetermined simultaneous equations (i.e., simultaneous equations where the number of the equations is larger than the number of unknowns). Namely, assume that n≧4 holds if P is a point on a two-dimensional space, and that n≧5 holds if P is a point on a three-dimensional space.

1. EMBODIMENT 1

Figure 1:
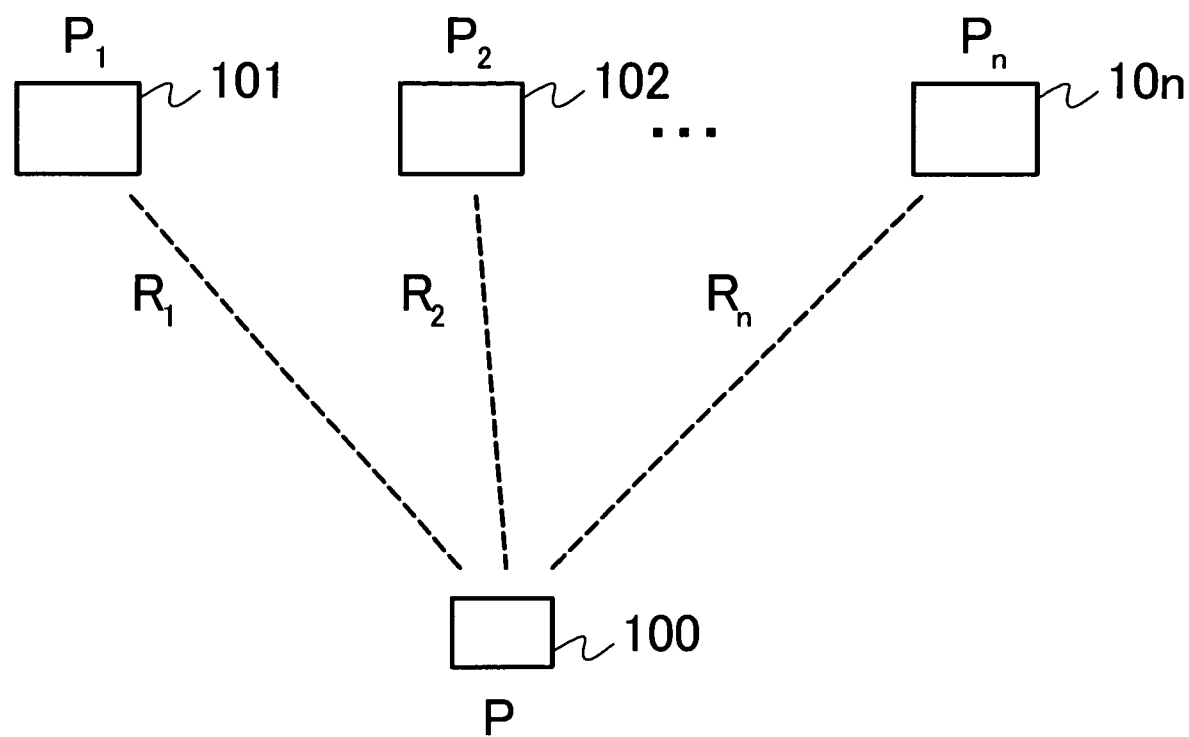
FIG. 1 is the configuration diagram of the position detection system which becomes the background art.

Next, quoting the notations in FIG. 1 and Expression 1 and referring to FIG. 2, the explanation will be given below concerning an embodiment of the position calculation method according to the present invention.

Figure 2:
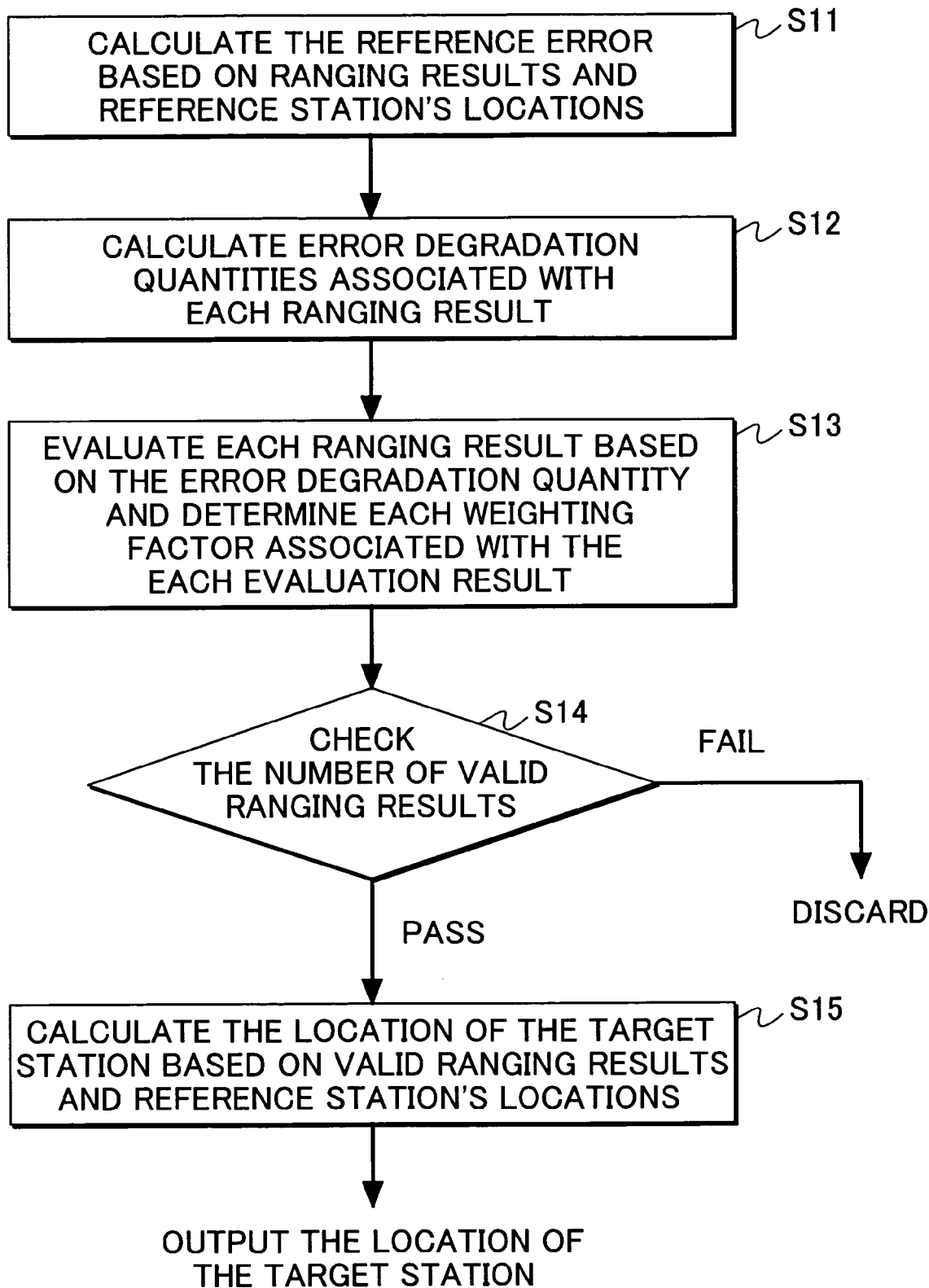
FIG. 2 is a flow diagram for illustrating a first embodiment of the position calculation according to the present invention.

In FIG. 2, S11 is a step of calculating a reference error $E_0$ based on the respective distance-ranging results and the positions of the respective reference stations. At the present step, as indicated in the following Expression 2, the above-described reference error $E_0$ is given as the minimum value of an error function E (P, T) with P and T selected as the variables, or an approximate value of the minimum value.

$$E_0 = \min_{P,T}(E(P, T)), \; E(P, T) \qquad \text{Expression 2}$$
$$= \sum_{k=1}^{n} W_k \{R_k + cT - \|P_k - P\|\}^2$$

In the same expression, assume that weight-assigning factors $W_k$ are equal to 1 all (i.e., $W_k=1$, k=1, ..., n). If, however, quality of the measurements on the distance-ranging results $R_k$ can be acquired, the weight-assigning factors $W_k$ may be defined as being positive numbers or 0 as numerical values for indicating the quality of the measurements on the distance-ranging results $R_k$. In this case, a function value may be given which will increase for the quality of the measurements. Here, the minimum value is defined as being 0. Moreover, in this case, a limitation may be imposed such that total sum of $W_k$ up to k=1, ..., n becomes equal to a constant number (e.g., n).

Incidentally, a concrete method for determining the reference error $E_0$ is equivalent to the method for solving the function minimization problem. Accordingly, this concrete method has been publicly known, and thus will be omitted.

Also, when determining the reference error $E_0$, if $P_{prv}$ and $T_{prv}$ satisfying the following Expression 3 had been acquired in the past attempt, the reference error $E_0=E(P_{prv}, T_{prv})$ may be definable.

$$\min_{P,T}(E(P, T)) \approx E(P_{prv}, T_{prv}) \qquad \text{Expression 3}$$

S12 is a step of calculating error degradation quantities about the respective distance-ranging results. At the present step, the error degradation quantities $\Delta E_i$ about the respective distance-ranging results $R_i$ are given by the following Expression 4.

$$\Delta E_i = E_0 - E_{i0}, \; i=1, \ldots, n \qquad \text{Expression 4}$$

Here, as indicated in the following Expression 5 and Expression 6, $E_{io}$ is given as the minimum value of an error function $E_i$ (P, T) with P and T selected as the variables, or an approximate value of the minimum value.

$$E_i(P, T) = \sum_{\substack{k=1 \\ k \neq i}}^{n} W_k \{R_k + cT - \|P_k - P\|\}^2, \qquad \text{Expression 5}$$

$$i = 1, \ldots, n$$

$$E_{i0} = \min_{P,T}(E_i(P, T)), \; i=1, \ldots, n \qquad \text{Expression 6}$$

Also, for simplifying the calculation, $E_{io}$ may be given by Expression 5 and the following Expression 7. Here, P and T yielding the reference error $E_0$ are set as being $P_0$ and $T_0$, respectively.

$$E_{i0}=E_i(P_0, T_0) \; E(P_0, T_0)=E_0, \; i=1, \ldots, n \qquad \text{Expression 7}$$

It can be interpreted that the error degradation quantities $\Delta E_i$ indicate quantities of errors by which the distance-ranging results $R_i$ influence the reference error $E_0$.

S13 is a step of evaluating the respective distance-ranging results based on the respective error degradation quantities calculated at the preceding step, and updating the weight-assigning factors about the respective distance-ranging results.

Figure 3:
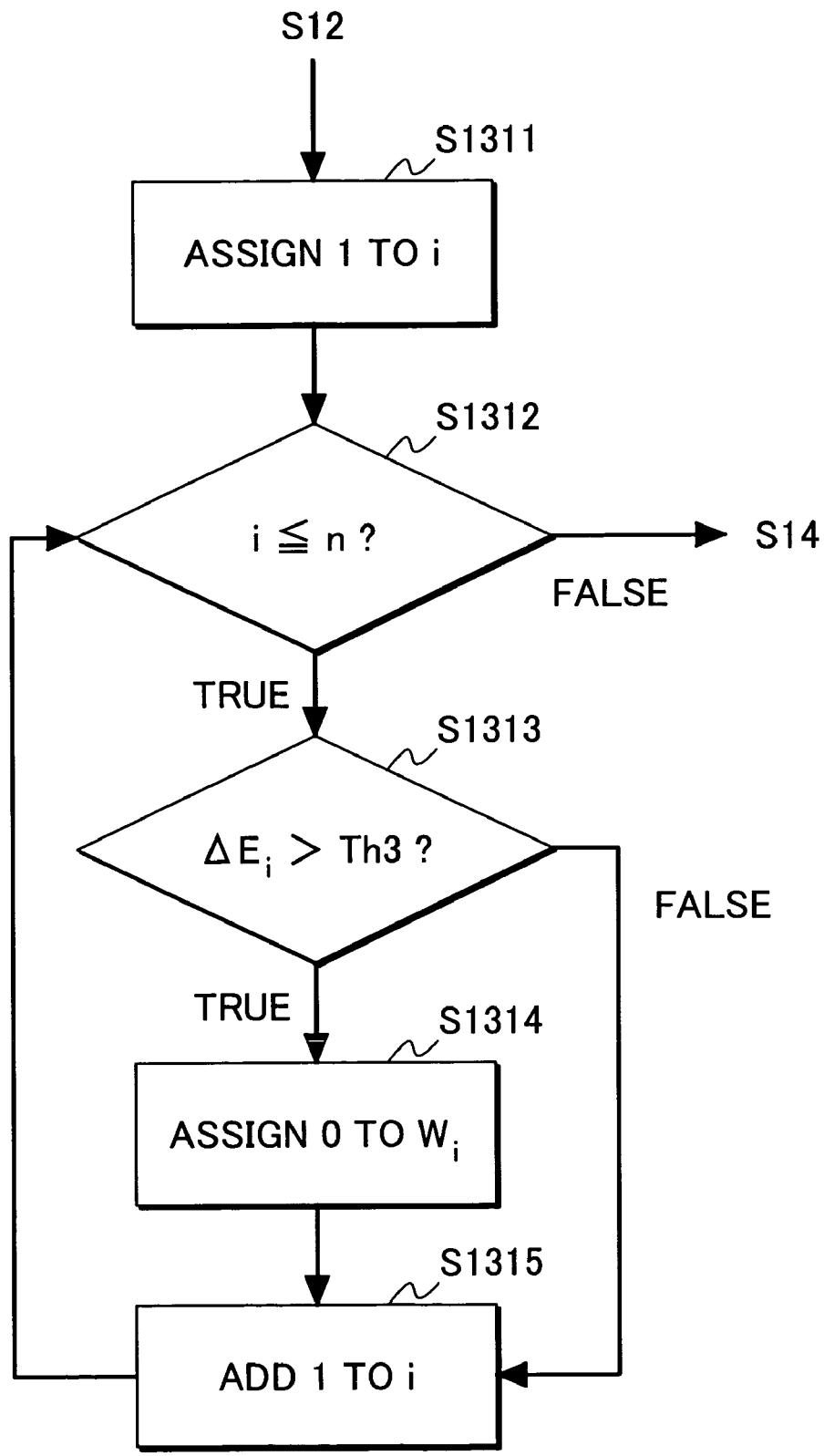
FIG. 3 is a flow diagram for illustrating steps of evaluation of distance-ranging results and updating of weight-assigning factors in the position calculation according to the present invention.

FIG. 3 illustrates an example of the details of carrying-out of the above-described step. In the same drawing, S1311 to S1315 indicate the details of S13 in FIG. 2. These steps make comparisons between a threshold value Th3 and the error degradation quantities $\Delta E_i$ for i=1, ..., n. Then, the steps update, to 0, the weight-assigning factors $W_i$ about the error degradation quantities $\Delta E_i$ which have exceeded the threshold value Th3.

Here, updating the weight-assigning factors $W_i$ to 0 means to eliminate the distance-ranging results $R_i$ in the position calculation later. The reason for this elimination is that, based on the error degradation quantities $\Delta E_i$, the error contained in the distance-ranging results $R_i$ has been evaluated as being large up to the degree of having exceeded the limit. Incidentally, at the present step, the threshold value Th3 may be determined in advance. Otherwise, the threshold value Th3 may be determined based on the number n of the distance-ranging results. Also, values of the weight-assigning factors $W_i$ may be updated such that, for example, the values become functions which will decrease with respect to increases in $\Delta E_i$ (however, its minimum value is made equal to 0).

S14 is a step of checking the valid distance-ranging-results number. The valid distance-ranging-results number refers to the number of the distance-ranging results which remain intact without being eliminated at the preceding step.

Figure 4:
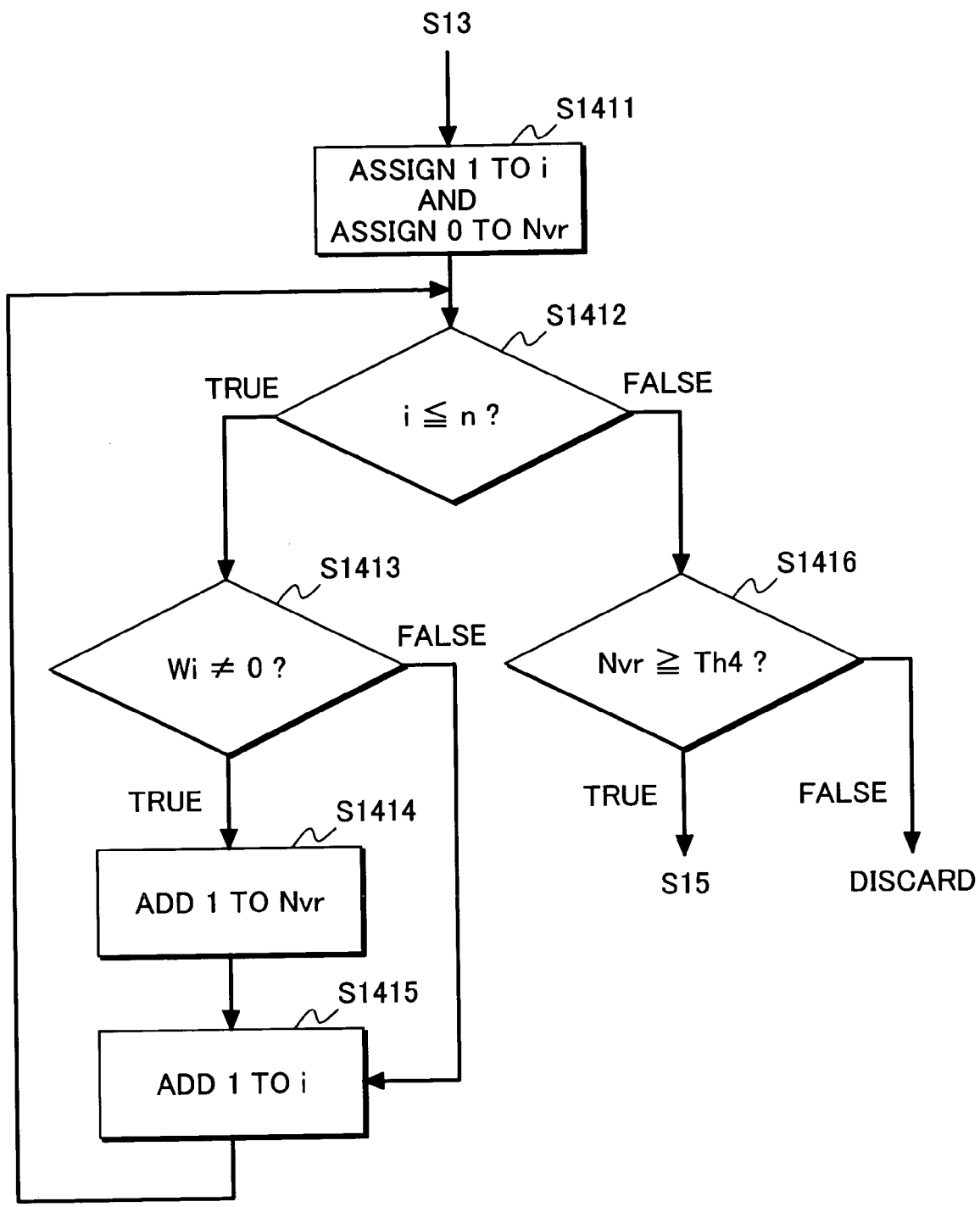
FIG. 4 is a flow diagram for illustrating checking of the number of valid distance-ranging results.

FIG. 4 illustrates an example of the details of carrying-out of the above-described step. At first, the number of $W_i$ (i=1, ..., n) which have turned out to become non-zero at the preceding step, i.e., the valid distance-ranging-results number Nvr, is determined (S1411 to S1415). Moreover, a comparison is made between a threshold value Th4 determined in advance and the valid distance-ranging-results number Nvr (S1416). Then, if the valid distance-ranging-results number Nvr has been found to be larger than the predetermined value (i.e., Nvr≧Th4), the processing proceeds to the next step S15.

Otherwise, the processing may be aborted, judging that the number of the valid distance-ranging results has been not prepared in the necessary number. In this case, the failure of the position calculation is reported to a higher-order function layer which is controlling the present step.

S15 is a step of calculating the position of the detection-target station based on the respective valid distance-ranging results and the positions of the respective reference stations. At the present step, using the weight-assigning factors $W_k$ (k=1, ..., n) updated at S13, P and T are determined which will yield the minimum value of the error function E (P, T) indicated in Expression 2. Then, the determined P is outputted as calculation result of the position of the detection-target station.

2. EMBODIMENT 2

Next, quoting the notations in FIG. 1 and Expression 1 and referring to FIG. 5, the explanation will be given below concerning a second embodiment of the position calculation method according to the present invention.

Figure 5:
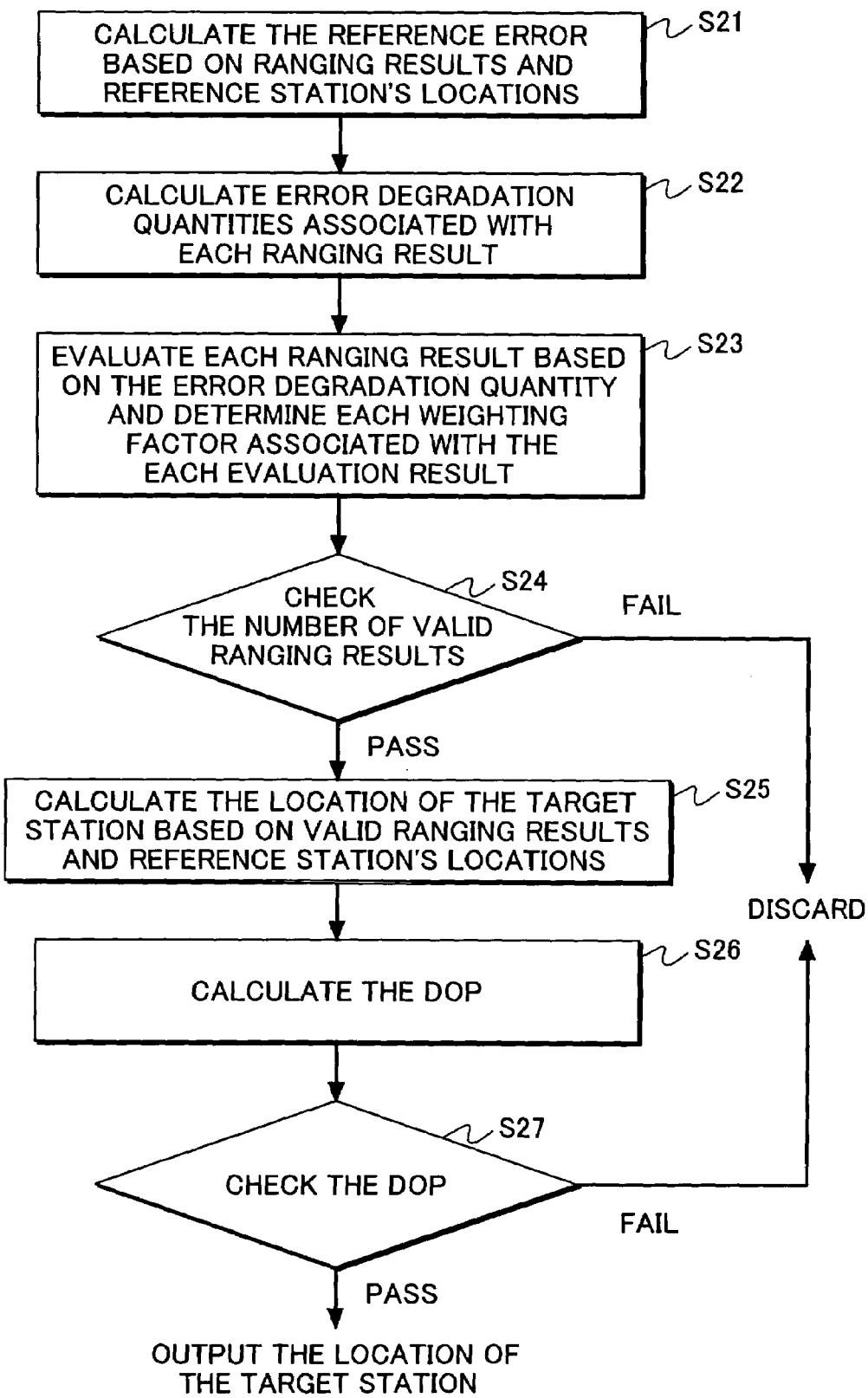
FIG. 5 is a flow diagram for illustrating a second embodiment of the position calculation according to the present invention.

In FIG. 5, respective steps from S21 to S24 are the same as the respective steps from S11 to S14 in FIG. 2, respectively. The details of these steps have been already explained in the first embodiment, and thus will be omitted.

S25 is a step of calculating the position of the detection-target station based on the respective valid distance-ranging results and the positions of the respective reference stations. At the present step, using the weight-assigning factors $W_k$ (k=1, ..., n) updated at S23, P and T are determined which will yield the minimum value of the error function E (P, T) indicated in Expression 2. Then, the processing proceeds to the next step.

S26 is a step of calculating Dilution of Precision (DOP) based on the position P of the detection-target station determined at the preceding step and the positions of the respective reference stations. In the calculation of DOP, however, the positions $P_k$ (k=1, 2, ..., n) of the reference stations will be eliminated for which the weight-assigning factors $W_k$ (k=1, 2, ..., n) updated at S23 become equal to 0. Incidentally, as DOP, HDOP (Horizontal Dilution of Precision) will be calculated if P is a point on a two-dimensional space, and PDOP (Position Dilution of Precision) will be calculated if P is a point on a three-dimensional space. The calculation method for HDOP and PDOP has been publicly known, and thus will be omitted.

S26 is a step of checking the Dilution of Precision (DOP) determined at the preceding step. At the present step, a comparison is made between a threshold value Th5 determined in advance and the Dilution of Precision (DOP) determined at the preceding step. Then, if the Dilution of Precision (DOP) has been found to be smaller than the predetermined value (i.e., DOP≦Th5), it is judged that the DOP has passed the above-described checking. Accordingly, the determined P is outputted as calculation result of the position of the detection-target station.

Otherwise, the processing may be aborted, judging that the DOP has failed in the above-described checking. In this case, the failure of the position calculation is reported to a higher-order function layer which is controlling the present step.

Figure 6:
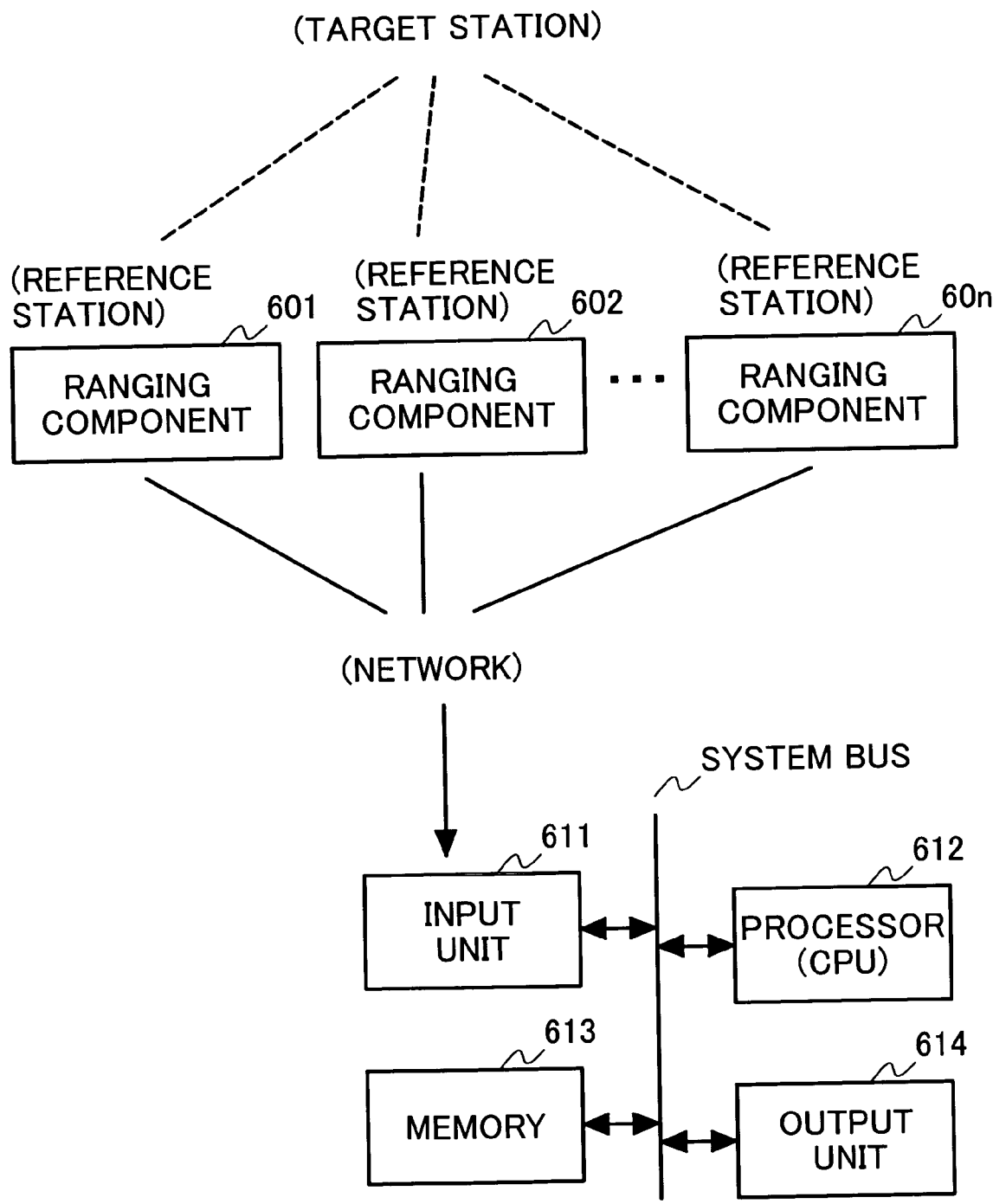
FIG. 6 is a configuration diagram of the position detection system relating to the present invention.

FIG. 6 is a configuration diagram of the position detection system relating to the present invention. In the same drawing, respective reference stations receive radio signals from a detection-target station. Then, distance-ranging units of the respective reference stations measure physical quantities for indicating distances up to the detection-target station. Here, the physical quantities for indicating the distances include RSS (Received Signal Strength) of a radio signal from the detection-target station, or TDOA (Time Difference of Arrival) of the radio signal from the detection-target station.

An input unit 611 includes a configuration component such as, e.g., NIC (Network Interface Card). The input unit 611 receives, via a network, the above-described respective physical quantities for indicating the distances from the respective reference stations. A processing unit 612 includes a configuration component such as, e.g., a CPU (Central Processing Unit) for executing programs. The processing unit 612 acquires the above-described measured physical quantities from the input unit 611, then making the conversion to the respective distances $R_i$ (i=1, 2, ..., n) as required. In addition thereto, the processing unit 612 acquires the positions $P_i$ (i=1, 2, ..., n) of the reference stations from a memory unit 613 so as to execute the position calculation program illustrated in FIG. 2 or FIG. 5, then outputting the position calculation result to the memory unit 613. The memory unit 613, which includes a configuration component such as, e.g., a hard disc or memory, stores therein the positions $P_i$ (i=1, 2, ..., n) of the reference stations and the position calculation result P. An output unit 614 includes a configuration component, such as, e.g., NIC (Network Interface Card) or an external output port to a display or printer. The output unit 614 outputs the position calculation result stored in the memory unit 613.

Figure 7:
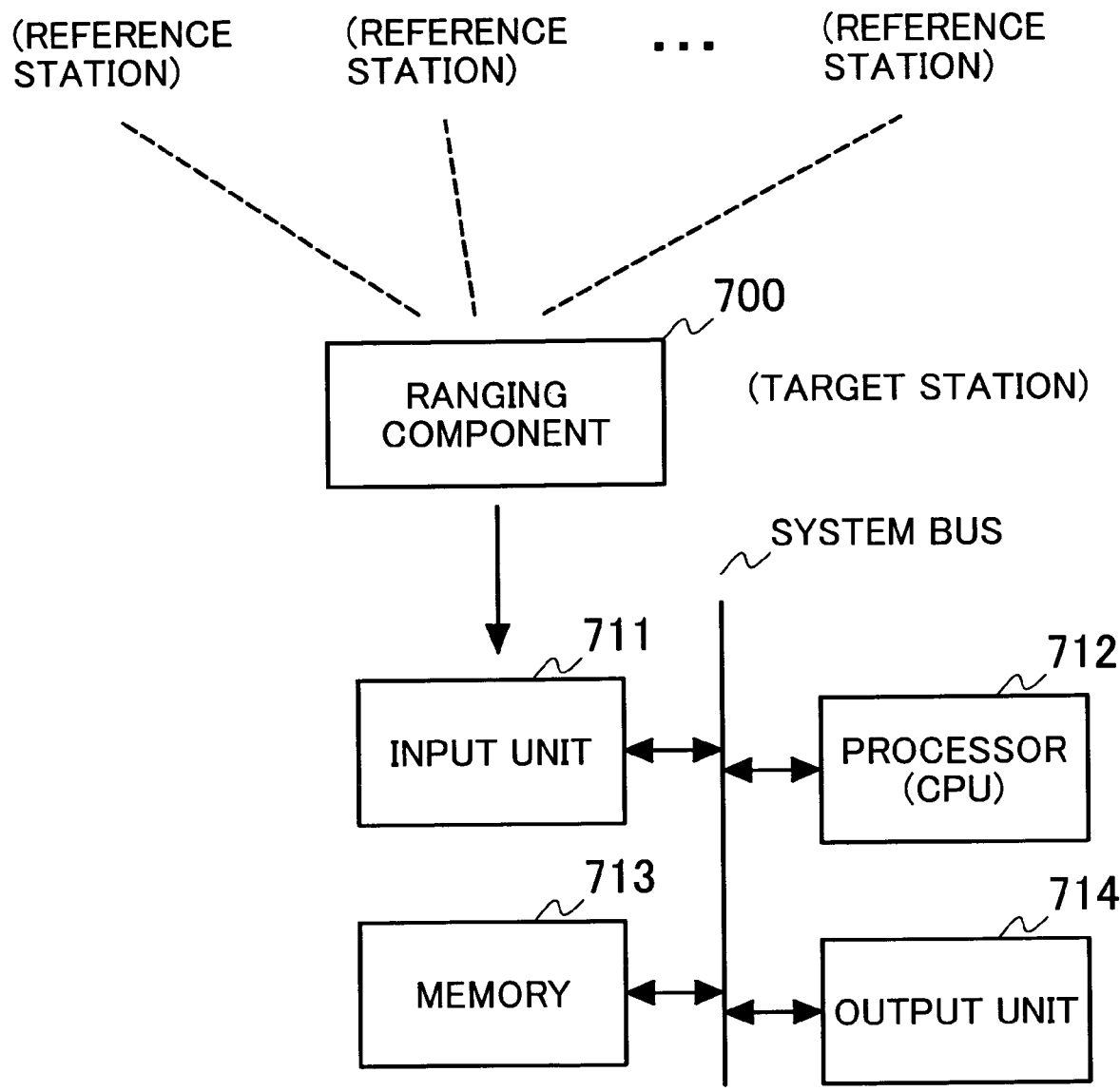
FIG. 7 is another configuration diagram of the position detection system relating to the present invention.

FIG. 7 is another configuration diagram of the position detection system relating to the present invention. In the same drawing, a detection-target station receives radio signals from respective reference stations, respectively. Then, a distance-ranging unit of the detection-target station measures physical quantities for indicating distances up to the respective reference stations. Here, the physical quantities for indicating the distances include RSS (Received Signal Strength) of a radio signal from a reference station, or TDOA (Time Difference of Arrival) of the radio signal from the reference station.

An input unit 711 includes a configuration component such as, e.g., a serial communications module. The input unit 711 receives the above-described respective physical quantities for indicating the distances from the distance-ranging unit. A processing unit 712 includes a configuration component such as, e.g., a CPU (Central Processing Unit) for executing programs. The processing unit 712 acquires the above-described physical quantities from the input unit 711, then making the conversion to the respective distances $R_i$ (i=1, 2, ..., n) as required. In addition thereto, the processing unit 712 acquires the positions $P_i$ (i=1, 2, ..., n) of the reference stations from a memory unit 713 so as to execute the position calculation program illustrated in FIG. 2 or FIG. 5, then outputting the position calculation result to the memory unit 713. The memory unit 713, which includes a configuration component such as, e.g., a hard disc or memory, stores therein the positions $P_i$ (i=1, 2, ..., n) of the reference stations and the position calculation result P. An output unit 714 includes a configuration component, such as, e.g., NIC (Network Interface Card) or an external output port to a display or printer. The output unit 714 outputs the position calculation result stored in the memory unit 713.

The position calculation method according to the present invention, in a multipath environment in particular, is effective in reducing an error of position calculation of a radio device based on distance-ranging results using electromagnetic waves. Consequently, the position calculation method, in an indoors environment, serves satisfactorily to enhance a precision of position detection of a radio terminal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A position calculation method, comprising the steps of:
receiving radio signals between a plurality of respective reference stations and a detection-target station by either said plurality of reference stations or said detection-target station, said plurality of reference stations being radio devices whose positions have been already known, said detection-target station being a radio device whose position has been unknown, measuring physical quantities about distances thereby to measure absolute distances or relative distances between said plurality of respective reference stations and said detection-target station, respectively, and calculating position of said detection-target station based on distance-ranging results and positions of said respective reference stations, said distance-ranging results being said respective distances measured, wherein said calculating step comprises the steps of:

calculating respective error degradation quantities $\Delta Ei$ from said respective distance-ranging results Ri and said positions Pi of said respective reference stations, said respective error degradation quantities being quantities of respective errors by which said respective distance-ranging results influence minimum value of square error function to solve the position of said detection-target station, evaluating said respective distance-ranging results based on said respective error degradation quantities, and updating weight-assigning factors Wi about said respective distance-ranging results, and calculating said position P of said detection-target station based on said respective distance-ranging results, said positions of said respective reference stations, and said respective weight-assigning factors updated.

2. The position calculation method according to claim 1, wherein said error degradation quantities $\Delta E_i$ are defined using $$\Delta E_i = E_0 - E_{i0}, i=1, \ldots, n$$

where Eo is the minimum value of said square error function using all measurements, n is a number of measurements, and Eio is a minimum value of square error function E not including distance-ranging result R.

3. The position calculation method according to claim 2, wherein said error degradation quantities $\Delta E_i$ are determined using variable values P and T acquired using $$E_0 = \min_{P,T}(E(P, T)), E(P, T) = \sum_{k=1}^{n} W_k \{R_k + cT - \|P_k - P\|\}^2$$

$$E_i(P, T) = \sum_{\substack{k=1 \\ k \neq i}}^{n} W_k \{R_k + cT - \|P_k - P\|\}^2, i = 1, \ldots, n$$

$$E_{i0} = \min_{P,T}(E_i(P, T)), i = 1, \ldots, n$$

where P is a position, T is offset of a clock selected as the reference, $W_k$ are weight-assigning factors, c is a speed of the radio waves, and $R_k$ are distance-ranging results.

4. The position calculation method according to claim 2, wherein said error degradation quantities $\Delta E_i$ are determined using variable values P and T acquired using $$E_0 = \min_{P,T}(E(P, T)), E(P, T) = \sum_{k=1}^{n} W_k \{R_k + cT - \|P_k - P\|\}^2$$

$$E_i(P, T) = \sum_{\substack{k=1 \\ k \neq i}}^{n} W_k \{R_k + cT - \|P_k - P\|\}^2, i = 1, \ldots, n$$

$$E_{i0} = E_i(P_0, T_0), E(P_0, T_0) = E_0, i = 1, \ldots, n$$

where P is a position, T is offset of a clock selected as the reference, Po and To are P and T providing Eo, $W_k$ are weight-assigning factors, c is a speed of the radio waves, and $R_k$ are distance-ranging results.

5. The position calculation method according to claim 3, wherein said step of updating said weight-assigning factors is a step of updating values of said weight-assigning factors based on comparisons between said respective error degradation quantities and a threshold value determined in advance.

6. The position calculation method according to claim 5, wherein said step of updating said weight-assigning factors about said distance-ranging results is a step of updating said values of said weight-assigning factors to zero if said error degradation quantities about said distance-ranging results have exceeded said threshold value determined in advance.

7. The position calculation method according to claim 6, wherein, before executing said step of calculating said position of said detection-target station, a step of checking the number of valid distance-ranging results is executed in order to judge possibility or impossibility of said execution of said position calculating step.

8. The position calculation method according to claim 7, wherein said checking of the number of said valid distance-ranging results is a checking based on a comparison between the number of said weight-assigning factors which become non-zero with respect to said respective distance-ranging results and a threshold value determined in advance.

9. The position calculation method according to claim 1, further comprising a step of calculating Dilution of Precision after having executed said step of calculating said position of said detection-target station, and judging success or failure of said position calculation of said detection-target station in accordance with a calculation value of said Dilution of Precision.

10. A computer-readable storage medium for storing a position calculation program for implementing a position calculation method in a position calculation apparatus, said position calculation apparatus, comprising:

an input unit for inputting physical quantities about distances, a processing unit, and an output unit, said physical quantities about said distances being measured such that radio signals between a plurality of respective reference stations and a detection-target station are received by either said plurality of reference stations or said detection-target station, said plurality of reference stations being radio devices whose positions have been already known, said detection-target station being a radio device whose position has been unknown, said position calculation method being executed by said processing unit, comprising the steps of:

calculating, from said physical quantities about said distances, absolute distances or relative distances between said plurality of respective reference stations and said detection-target station, respectively, and calculating position of said detection-target station based on distance-ranging results and positions of said respective reference stations, said distance-ranging results being said respective distances measured, wherein the calculating step includes the steps of:

calculating respective error degradation quantities from said respective distance-ranging results and said positions of said respective reference stations, said respective error degradation quantities being quantities of respective errors by which said respective distance-ranging results influence least square error, evaluating said respective distance-ranging results based on said respective error degradation quantities, and updating weight-assigning factors about said respective distance-ranging results, and calculating said position of said detection-target station based on said respective distance-ranging results, said positions of said respective reference stations, and said respective weight-assigning factors updated.

* * * * *